Nov. 21, 1933. P. H. FALTER 1,935,627
APPARATUS FOR FEEDING CATALYST
Filed June 26, 1929
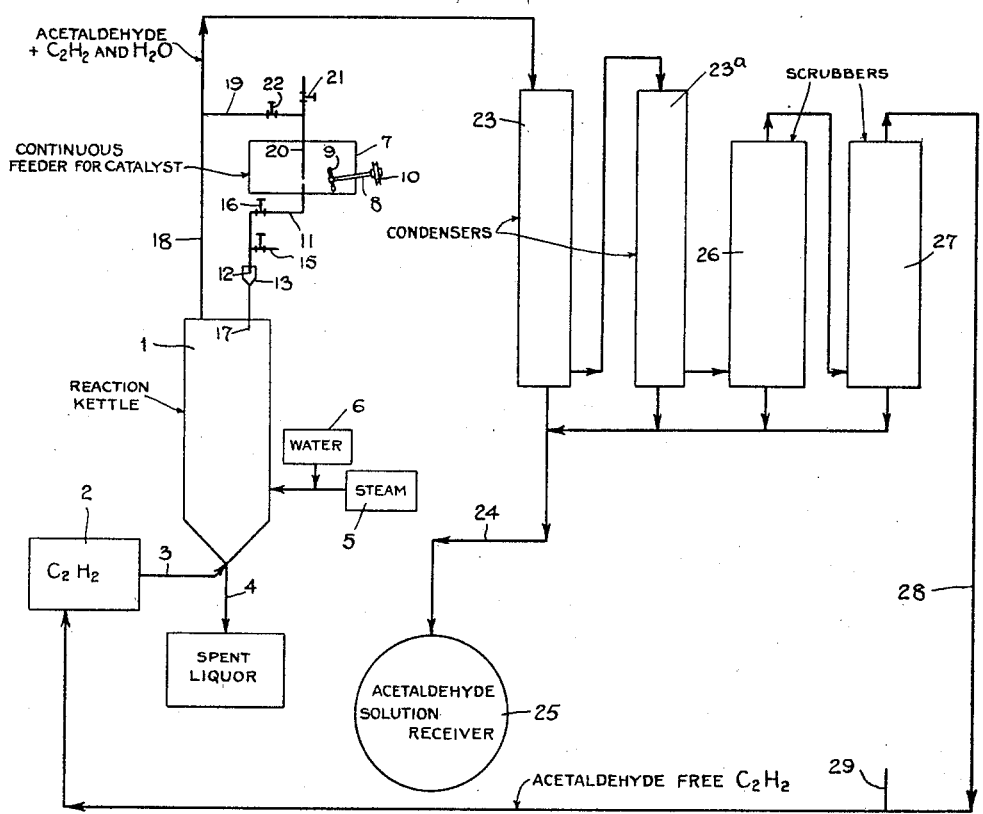
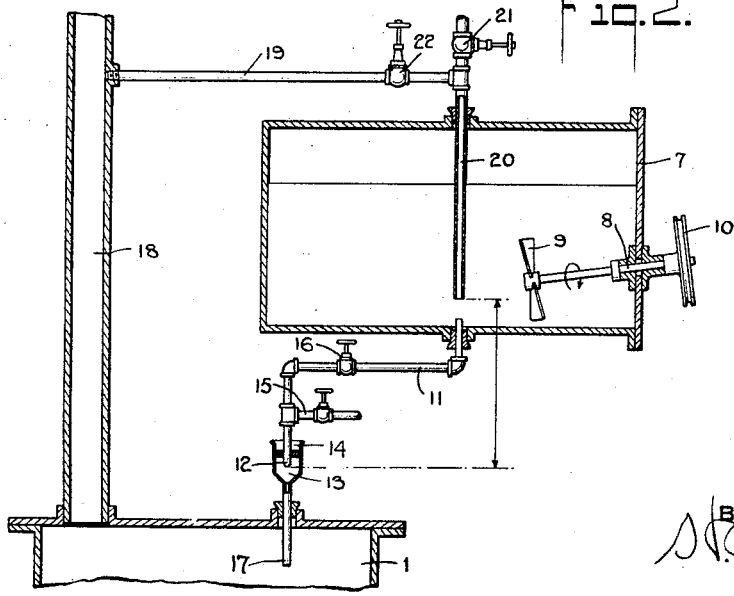
INVENTOR
Philip H. Falter
BY
ATTORNEY Patented Nov. 21, 1933

1,935,627

UNITED STATES PATENT OFFICE 1,935,627

APPARATUS FOR FEEDING CATALYST

Philip H. Falter, Orange, N. J., assignor to American Cyanamid Company, New York, N. Y., a corporation of Maine Application June 26, 1929. Serial No. 373,809

1 Claim. (Cl. 23—285)

This invention relates to means for continuously feeding a liquid material, and is particularly concerned with means for supplying a mixture of catalyst and other reagents to a kettle or container within which a chemical reaction is taking place.

The present invention finds particular application in the conversion of acetylene to acetaldehyde as a continuous process in which it is necessary to continuously feed catalyst and some of the reactants to a reaction chamber, although obviously the invention is not to be limited in its use to such a process.

An efficient method for continuously converting acetylene to acetaldehyde may consist in introducing the acetylene to a reaction kettle having therein a 200 lb. charge containing the equivalents of 40 lbs. of 60° Bé. sulphuric acid and 75 grams of mercury, the remainder being principally water, a certain amount of manganese dioxide being added, as desired. In order to maintain the desired quantity of reactant mixture in the kettle, as the acetaldehyde and spent liquor are withdrawn, it becomes necessary to continuously add reactants in addition to the incoming acetylene, and it is the method of and means for continuously introducing these reactants with which this invention is concerned. In one aspect of the invention it includes a tank of a suitable material normally closed to the atmosphere and adapted to receive a mixture of sulphuric acid, manganese dioxide and mercury either in the metallic form or as mercuric sulphate. A stirrer is provided to maintain the ingredients in an agitated state to prevent the sedimentation of the solids. A suitably calibrated connection is provided between the tank and the reaction kettle and including a sight feed so that the operator may observe the flow of reactants to the kettle. The parts are so arranged that not only will the feed be constant, but the flow will be maintained under constant pressure regardless of the pressure in the reaction kettle or the amount of fluid in the tank.

In order to relieve the vacuum which would normally be produced in the tank by the flowing of fluid therefrom, provision is made whereby a portion of the atmosphere of the reaction kettle may be admitted to the tank below the liquid level thereof. The evolved acetaldehyde together with some steam and unconverted acetylene passes over from the top of the reaction kettle to a series of condensers in which a portion of the acetaldehyde and water is condensed and is conducted to a receiver. The uncondensed gases from the series of condensers are then passed through a series of scrubbers using water as the absorbing agent, this water removing the last traces of acetaldehyde so that the final gas passing out of the last scrubber is substantially acetaldehyde-free acetylene which is conducted back to the acetylene supply in a closed cycle. The acetaldehyde solution recovered from the condensers and scrubbers may be used in its present state of concentration or distilled as desired.

The invention further consists in the novel construction, combination and arrangement of parts and steps performed as hereinafter described and shown in the accompanying drawing.

In the drawing:

Fig. 1 is a diagrammatic view of the apparatus for carrying out the complete process, and Fig. 2 is an enlarged detail of the continuous feeder.

Referring now with particularity to the embodiment illustrated in the combined diagrammatic showing of the apparatus and the flow sheet, I provide a reaction kettle of any desired type into which acetylene from a suitable source is introduced through valved connections 3 into the bottom thereof. Spent liquor is periodically removed through the connection 4 as desired.

As it is frequently necessary to add steam for supplying the necessary heat of reaction or additional water to maintain the proper dilution, a source of the former is indicated at 5 and the latter at 6.

As the reaction proceeds, it will be found necessary to add to the reaction kettle sulphuric acid, manganese dioxide and a catalyst such as mercury, or a compound thereof, and this may be done by providing a tank 7 above the reaction kettle, the tank being in this instance made of steel and rubber lined to prevent corrosion. Suspension within the tank is maintained by means of an agitator having a shaft 8 penetrating the wall of the tank 7 and terminating in a propeller 9, driven by means of the pulley 10 from any desired source. It is preferable that the shaft 8 be maintained at an angle to the bottom of the tank 7 in order to cause a perceptible sweep across the bottom thereof as this will tend to prevent the settling out of the solid reactants.

The material charged into the tank 1 may, for example, comprise a mixture containing manganese dioxide, 60° sulphuric acid and mercury which is fed into the reaction kettle through the tube 11, the top of which penetrates the bottom of the tank 7. The lower end of the tube 11 terminates in a calibrated tip 12 contained within a transparent vessel 13 which is closed by a stopper 14 so that the feed may be watched. A vent 15 is located between the tip 12 and the tank 7 and provided with a valve, the feed tube 11 being likewise provided with a valve 16 above the vent 15, all for a purpose to be more fully described hereinafter. The vessel 13 terminates in a tube 17 suitably secured into the top of the reaction chamber 1 to drop the contents of the tank 7 into the kettle. The offtake for gaseous reaction products from the kettle 1 is shown at 18, which offtake is tapped as at 19 to connect with a tube 20 extending from above the top of the tank 7 to a point near the bottom thereof and is suitably valved as at 21 and 22. It is desirable that the difference in level between the bottom of tube 20 and the connection at 19 be such that under a maximum decrease in pressure in tube 18, the liquid mixture in tank 7 will not be forced into tube 19.

With the mechanism thus described it will be seen that the delivery of mixture takes place under constant pressure represented by the difference in levels between the bottom of the tube 20 and the bottom of the calibrated tip 12. This difference is constant for any given setting and is necessarily independent of the level of the mixture in the tank or of fluctuation in kettle pressure. As the material flows from the tank 7 through the calibrated tip 12 into the kettle 1 the vacuum above the liquid level in the tank is relieved through the tube 19, to wit: by atmosphere from the kettle itself.

In case of stoppage occurring at the tip 12, it only becomes necessary to close the valve 16 in the feed line 11 and the valve in the vent 15 opened whereupon the pressure within the kettle will blow back through the tip 12 and out of the vent 15 thus clearing the tip and removing the obstruction. In the same manner any stoppage which may occur in the feed line 11 may be removed by closing the valve 22 and opening the valve 21, allowing the atmosphere of the kettle under kettle pressure to blow back through the feed line 11.

The gaseous products of the reaction consisting principally of acetaldehyde together with water vapor, steam and some unconverted acetylene, finds its way to the condensers 23 and 23a, from the bottom of which condensed acetaldehyde and water flows by way of the pipe 24 to the acetaldehyde solution receiver 25. The uncondensed gases are taken from the condensers and passed through a series of scrubbers 26 and 27 through which water is made to flow in a counter-current manner, (not shown), the liquid from the scrubbers likewise emptying into the receiver 25. As a result of the condenser and scrubber action substantially acetaldehyde-free acetylene is taken off from the scrubber 27 and this acetylene is returned through the line 28 to the source of supply 2 for further use. As the acetylene circuit is a closed one, it has been found that certain gaseous impurities accumulate therein which have a tendency to diminish the efficiency of the process, and hence it is desirable periodically to vent this gas and it may preferably be done through the cock 29.

No attempt has been made in this application to set forth accurate details of operation or of proportion of ingredients or rates of flow thereof in order to efficiently produce acetaldehyde from acetylene as many factors enter into the process which are not uniformly applicable. However, there has been disclosed a method and means for continuously feeding a fluid material to a reaction kettle within which pressure is maintained, such mechanism and process providing for a constant calibrated controlled flow.

Obviously, the invention is not to be limited specifically to a process for the production of acetaldehyde as the invention may be readily adapted for the feeding of other fluids than those here mentioned in other processes than here set out.

In commercial practice it will be found necessary to provide such instrumentalities as flowmeters, gas compressors, means for cooling the water and brine passing through the condensers and the absorbent used in the scrubbers, but as all of these elements are well known and within the knowledge of the man skilled in this art, it is not thought necessary to show them in detail here. It is to be understood that the showing particularly of Fig. 1 is diagrammatic of the outline of a process within which the continuous feeder shown in detail in Fig. 2 is applicable.

What I claim is:

In combination, a reaction kettle in which pressure is maintained, a tank for feeding liquid material thereto, a conduit connecting the tank with the kettle for feeding material to the kettle, and a connection between the kettle and the tank for relieving the vacuum in the tank caused by movement of the material from the tank to the kettle, said conduit including a calibrated feed tip, the end of which is within a transparent container.

PHILIP H. FALTER.